July 28, 1931.  J. L. BAIRD  1,816,106
MEANS FOR DRIVING TELEVISION OR OTHER APPARATUS AT A PREDETERMINED SPEED
Filed May 14, 1928
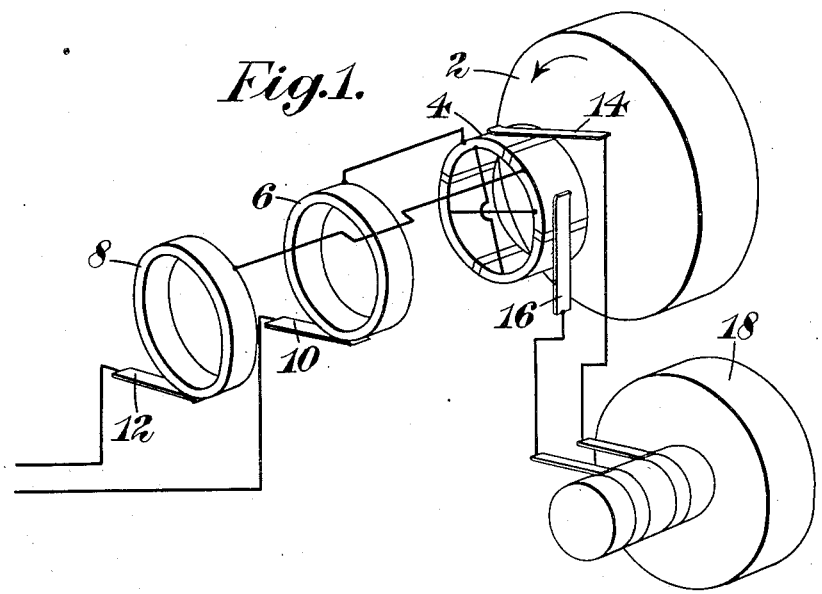
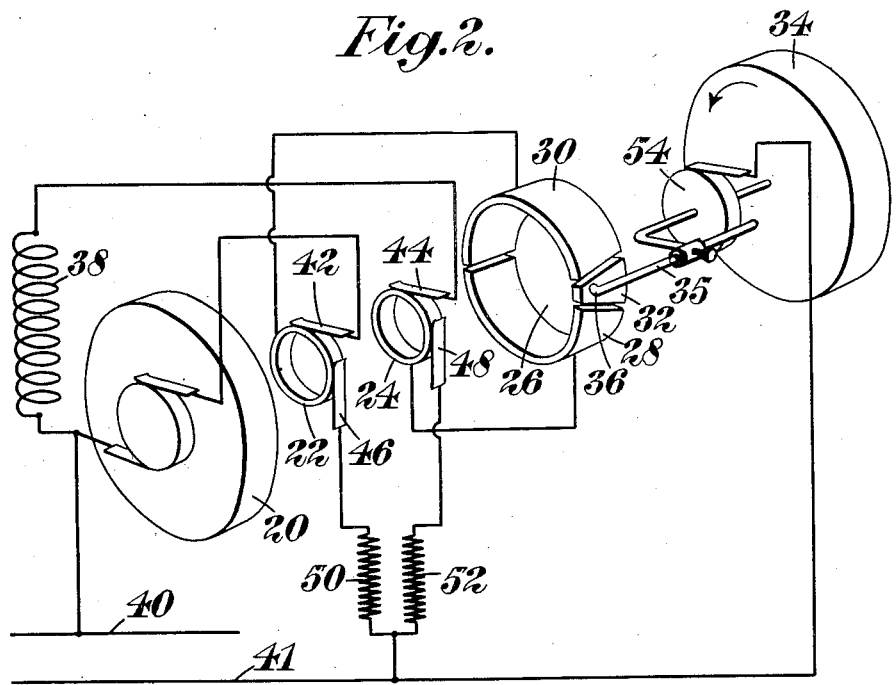

Patented July 28, 1931

1,816,106

UNITED STATES PATENT OFFICE

JOHN LOGIE BAIRD, OF LONDON, ENGLAND, ASSIGNOR TO TELEVISION LIMITED, OF LONDON, W. C. 2., ENGLAND, A BRITISH COMPANY

MEANS FOR DRIVING TELEVISION OR OTHER APPARATUS AT A PREDETERMINED SPEED

Application filed May 14, 1928, Serial No. 277,750, and in Great Britain June 7, 1927.

This invention has for its object to provide improved means for driving television or other apparatus at a predetermined speed, one of the advantages being that the synchronous operation of two different sets of apparatus, for example a transmitter and a receiver, is readily obtainable.

According to this invention, means for driving television or other apparatus at a predetermined speed comprises a constant-speed motor, such for example as a fork-controlled phonic wheel, a reversing-switch operated thereby at a constant frequency, and means for supplying direct-current to the switch, whereby an alternating current of constant frequency is rendered available. This alternating current can be used to drive a synchronous motor of which the speed is controlled by the frequency of its supply current, so that the speed of this motor is accurately controlled by the speed of the constant-speed motor above mentioned.

The particular advantage of this arrangement is that a constant-speed motor which will give the desired accuracy or high degree of constancy of speed is not, in the forms at present available, adapted to give any considerable output of power, and moreover, is not usually capable of coping with a variable load without impairing the constancy of its speed. With the arrangement according to this invention, however, the load upon the constant-speed motor is merely the frictional resistance to movement of the reversing switch, which, of course is substantially constant; this load is unaffected by the current which may be passing through the reversing-switch, and the current can therefore cope with all loads or variations of load which may be encountered by the synchronous motor driving the apparatus, without the speed of the synchronous motor being affected.

According to a preferred construction of this invention, the reversing switch comprises a commutator whereof alternate segments are connected in common to one of a pair of slip-rings, the remaining segments of the commutator being connected to the other of the pair of slip-rings. The usual brush-gear is provided for the commutator and slip-rings, direct current being supplied to one pair of brushes and alternating current being rendered available to the other pair.

Whilst a fork-controlled phonic wheel is a very convenient type of constant-speed motor for use in accordance with this invention, various others may be used, such for example as a clockwork motor.

In a modified form of this invention in which it is desired to drive the apparatus by a direct-current motor, there is provided the combination with the direct-current motor whereof the speed is to be controlled, and a constant-speed motor as above mentioned, of a set of contacts rotating with one and a co-operating contact rotating with the other of these motors, which contacts by their relative movement effect the control of the speed of the direct-current motor. The contacts may, for example, be connected with suitable resistances which are inserted in or removed from the field circuit or the armature circuit of the direct-current motor by the relative movement of a single contact over the set of contacts.

Devices in accordance with this feature of the invention may take various forms, and conveniently the set of contacts is constituted by a commutator-like device mounted on the shaft of the motor whereof the speed is to be controlled, and the contact to co-operate therewith may be a single brush-member which is carried by and rotated with the constant-speed motor.

In the accompanying diagrammatic drawings—

Figure 1 indicates one construction of speed-control means according to the invention; and Figure 2 indicates a modified construction thereof.

In Figure 1, a constant-speed motor 2 is operatively connected—by any suitable means, not shown—with a commutator 4 and a pair of slip-rings 6 and 8 so as to rotate these parts at a constant speed. As shown, the commutator has four equal segments, opposite pairs of which are connected electrically together and also, respectively, to the pair of slip-rings 6 and 8. These rings 6 and 8 and consequently the pair of commutator segments to which they appertain, are connected electrically with a suitable source of direct-current supply by means of brushes 10 and 12. Brushes 14, 16 bearing upon adjacent segments of the commutator 4 are in a circuit which includes a synchronous alternating-current motor.

In the arrangement just described, rotation of the commutator 4 by the constant-speed motor 2 results in direct-current supplied to the slip-rings 6 and 8 being converted by the commutator into an alternating current of constant frequency which is employed to drive the synchronous motor 18.

For the sake of clearness the commutator 4 is shown in the drawing as being provided with but four segments, but obviously the number of the segments may be increased to suit requirements, provided that alternate segments are all in electrical connection with one another and with one or the other of a pair of slip-rings, such as 6 and 8.

Referring next to Figure 2, the arrangement indicated therein comprises a shunt-wound or compound-wound direct-current motor 20 which has mounted on its shaft (not shown in the drawing) a pair of slip-rings 22, 24, and a commutator device 26 having two insulated contact-segments 28, 30, separated by a segment 32 insulated from them. For the purpose hereinafter described, the insulated segment aforesaid is tapered as to its circumferential width axially of the commutator.

A constant-speed motor 34, such as a fork-controlled phonic wheel, is mounted with its shaft coaxial with that of the direct-current motor 20, and it carries an arm 35 for a contact-piece 36 engaging the surface of the commutator. It is desired that the direct-current motor 20 should run at the same speed as the phonic wheel 34, and when the condition is obtained the contact-piece 36 bearing upon the segment 32 will rotate with the commutator 26 and have no motion relatively thereto.

One end of the circuit of the field-winding 38 and of the armature of the direct-current motor 20 are connected in the usual manner to one of the supply-mains 40 and the other ends of these two circuits are brought to brushes 42, 44 which engage the two slip-rings 22, 24. From these slip-rings connections are made to the two segments 28, 30 of the commutator, the ring 22 being connected electrically with the segment 30 and the ring 24 with the segment 28. Two other brushes 46, 48 bear on the slip-rings 22, 24 and are connected respectively to regulating resistances 50, 52. The other ends of these two resistances are connected together and to the other supply-main 41, and a connection is also made from this supply-main to a slip-ring 54 which is electrically connected with the contact-arm 35 carried by the phonic motor 34. The field circuit of the machine is therefore completed from one supply main 40 through the brush 44 to the slip-ring 24 and through the other brush 48 and regulating resistance 52 to the supply-main 41. A shunt circuit is provided from the slip-ring 24 through one of the commutator segments, and the contact-piece 36 if it is in contact therewith, then through the third slip-ring 54 to the supply-main 41. The armature circuit is similarly completed through the slip-ring 22 and regulating resistance 50 with a shunt-circuit through the other commutator segment 30 and contact-piece 36, if it should be in contact therewith.

The two motors 20, 34 are set in operation and may be brought to approximate synchronism by means of stroboscopic observations. If the contact-piece 36 is on the segment 32 and the two motors are running at equal speeds, both resistances 50, 52 will be in circuit and this condition will be maintained. If now the speed of the direct-current motor 20 increases, the contact-piece 36 will be moved to the segment 28 in the field circuit and will short-circuit the regulating resistance 52, and the speed of the motor 20 will be reduced. If, on the other hand, the speed of the motor 20 should fall, the contact-piece 36 will engage the commutator segment 30 and will short-circuit the armature resistance 50, thereby increasing the speed.

It will be clear that instead of effecting the control on both the field and the armature, either alone could be used with graduated resistances instead of only a single resistance. Similarly, also, a greater number of controlling segments than two could be used in the commutator, each segment introducing or short-circuiting a suitable resistance, as may be desired.

The tapered formation of the contact segment 32 above referred to facilitates the obtaining of the desired speed; the contact-brush or contact-piece 36 is arranged to be moved axially of the commutator, and when it is at one end, a relatively large movement of the brush relatively to the commutator is permitted before any controlling effect is exercised, but if the brush be moved to the other narrow end of the segment, the controlling effect becomes operative for a smaller angular movement of the brush relatively to the commutator.

It will be appreciated that the invention is not limited to the particular embodiments hereinbefore described, for various other mechanical arrangements and speed-controlling circuits may be used within the scope of the present invention.

I claim:—

1. In apparatus of the class described, the combination with a direct current motor, of a constant speed motor associated therewith, means for regulating the speed of said direct current motor, and a controlling mechanism for said regulating means, said mechanism comprising a set of contacts rotated by one motor and a cooperating contact rotated by the other motor in substantial synchronism with said set of contacts whereby relative displacement of said separately driven contacts resulting from a difference in speed between the said motors serves to operate said regulating means, said set of contacts consisting of a plurality of annular segments having the adjacent ends thereof inclined to converge toward one side of the said segments, whereby adjustment of the cooperating contact in the direction of convergence or divergence of the segment ends serves to accelerate or retard the response of the mechanism to differences in the normal relative motor speeds.

2. In apparatus for controlling the speed of a direct current motor having an armature winding and a field winding in shunt therewith, the combination with a resistance in series with said armature winding and a resistance in series with said field winding, of means for short circuiting either of said resistances in response to variations in the speed of said motor, said means comprising a constant speed motor, a pair of contacts driven by one of said motors, each of which is associated with one of said resistances, and a cooperating contact driven by the other motor in substantial synchronism with said pair of contacts, whereby relative displacement of said separately driven contacts serves to connect either one of said pair of contacts with said cooperating contact to bridge the corresponding winding, the adjacent ends of said pair of contacts converging toward one side thereof, whereby adjustment of said cooperating contact in the direction of convergence or divergence of said pair of contacts serves to vary the responsiveness of said means to changes in relative position of the separately driven contacts.

3. In apparatus of the class described, the combination with a commutator-like member having a pair of annular segments provided with inclined ends converging toward one side thereof and a wedge shaped insulating portion therebetween, of a coaxially mounted cooperating contact engaging said member and adjustable axially thereof, said contact normally resting on said insulating portion, separate means for driving said member and said contact at substantially the same speed, and means responsive to engagement of said contact with either of said segments to vary the relative rates of speed of said first mentioned means.

In testimony whereof I affix my signature.

JOHN LOGIE BAIRD.